United States Patent
Sullivan et al.

(10) Patent No.: US 10,377,090 B2
(45) Date of Patent: Aug. 13, 2019

(54) MULTIFUNCTIONAL REACTIVE INKS, METHODS OF USE AND MANUFACTURE THEREOF

(71) Applicant: Lawrence Livermore National Security, LLC, Livermore, CA (US)

(72) Inventors: Kyle Sullivan, Pleasanton, CA (US); John M. Densmore, Livermore, CA (US); Eric Duoss, Dublin, CA (US); Alexander E. Gash, Brentwood, CA (US); Joshua Kuntz, Livermore, CA (US); John Vericella, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1079 days.

(21) Appl. No.: 14/049,141

(22) Filed: Oct. 8, 2013

(65) Prior Publication Data
US 2015/0099102 A1 Apr. 9, 2015

(51) Int. Cl.
*B29C 67/00* (2017.01)
*C09D 11/02* (2014.01)
(Continued)

(52) U.S. Cl.
CPC ........ *B29C 67/0055* (2013.01); *B29C 64/106* (2017.08); *C09D 11/02* (2013.01); *C09D 11/03* (2013.01); *Y10T 428/24893* (2015.01)

(58) Field of Classification Search
CPC .................................. C06B 45/08; C06B 45/30
See application file for complete search history.

(56) References Cited

U.S. PATENT DOCUMENTS 3,325,316 A * 6/1967 MacDonald .................... 149/17
3,600,163 A * 8/1971 Badia et al. .................. 420/513
(Continued)

FOREIGN PATENT DOCUMENTS

| EP | 0970776 | 1/2000 |
| EP | 0988919 A1 | 3/2000 |
| WO | WO2008013806 | 1/2008 |

OTHER PUBLICATIONS

US 6,875,521 B2, 04/2005, Weihs (withdrawn)
(Continued)

*Primary Examiner* — Colin W. Slifka
(74) *Attorney, Agent, or Firm* — Dominic M. Kotab

(57) ABSTRACT

In one embodiment, a material includes a plurality of particles, a solvent system and one or more stabilizing agents; the particles are configured to complete a self-propagating and/or self-sustaining reaction upon initiation thereof. In another embodiment, a method includes dispersing a plurality of particles in solution to form a dispersion and adding a stabilizing agent to the dispersion in an amount sufficient to cause the dispersion to exhibit one or more predetermined rheological properties; again, the particles in the dispersion are configured to complete a self-propagating and/or self-sustaining reaction upon initiation thereof. In still another embodiment, a method includes depositing a material on a substrate; the material includes a plurality of particles configured to complete a self-propagating and/or self-sustaining reaction upon initiation thereof, a solvent system and one or more stabilizing agents.

22 Claims, 5 Drawing Sheets

(51) Int. Cl.
C09D 11/03 (2014.01)
B29C 64/106 (2017.01)

(56) References Cited

U.S. PATENT DOCUMENTS

| | | | |
|---|---|---|---|
| 3,753,810 A * | 8/1973 | Leneveu et al. | 149/8 |
| 3,794,535 A * | 2/1974 | Bertrand et al. | 149/3 |
| 5,980,785 A | 11/1999 | Xi et al. | |
| 6,030,755 A * | 2/2000 | Matsumoto et al. | 430/351 |
| 6,051,242 A * | 4/2000 | Patel et al. | 424/401 |
| 6,156,130 A | 12/2000 | Hegner et al. | |
| 8,048,242 B1 * | 11/2011 | Tappan et al. | 149/37 |
| 8,460,451 B2 | 6/2013 | Xu et al. | |
| 2003/0230335 A1 * | 12/2003 | Tsukahara | 136/252 |
| 2004/0247931 A1 | 12/2004 | Weihs et al. | |
| 2005/0189520 A1 * | 9/2005 | Okada | C09D 11/322 |
| | | | 252/500 |
| 2007/0224441 A1 | 9/2007 | Bunyan | |
| 2008/0000382 A1 | 1/2008 | Li et al. | |
| 2009/0108229 A1 | 4/2009 | Silverman et al. | |
| 2009/0148680 A1 * | 6/2009 | Toyoda | 428/210 |
| 2009/0186195 A1 | 7/2009 | Spraker et al. | |
| 2012/0061454 A1 | 3/2012 | Rudd et al. | |
| 2012/0141747 A1 * | 6/2012 | Deeter et al. | 428/195.1 |
| 2012/0231159 A1 | 9/2012 | Weihs et al. | |
| 2012/0231232 A1 | 9/2012 | Xu et al. | |

OTHER PUBLICATIONS

Fischer et al. ("A Survey of Combustible Metals, Thermites, and Intermetallics for Pyrotechnic Applications," presented at the 32nd AIAA/ASME/SAE/ASEE Joint Propulsion Conference, Jul. 1996).*
Krylov et al. ("Possibilities of Producing Thermite Mixtures Based on B4C-Metal and SiC-Metal Composites," Poroshkovaya Metallurgiya 12(156), pp. 57-60, Dec.*
Sullivan et al.,"Electrophoretic Deposition of Thermites onto Micro-Engineered Electrodes Prepared by Direct-Ink Writing," Journal of Physical Chemistry B 117(6), pp. 1686-1693, Sep. 2012.*
Cao et al., "Joining of TiAl intermetallic by self-propagating high-temperature synthesis," Journal of Materials Science 41(15), pp. 4720-4724, Aug. 2006.*
Eluri et al., "Silver nanoparticle-assisted diffusion brazing of 3003 Al alloy for microchannel applications," Materials and Design 36, pp. 13-23, Apr. 2012.*
Walker et al., "Reactive Silver Inks for Patterning High-Conductivity Features at Mild Temperatures," 2012 American Chemical Society, Journal of the American Chemical Society, vol. 134, 2012, pp. 1419-1421.

Pascal et al., "Joining of nickel monoaluminide to a superalloy substrate by high pressure self-propagating high-temperature synthesis," 2002 Elsevier Science B.V., Journal of Alloys and Compounds, vol. 337, 2002, pp. 221-225.
Orling et al., "Self-Propagating High-Temperature Synthesis as a Process for Joining Materials," Welding Research Supplement, Mar. 1996, pp. 93-100.
Matsuura et al., "Padding, Welding and Freeform Fabrication of Nickel Aluminide Intermetallic Compound by Reactive Rapid Prototyping Process," 2002 The Japan Institute of Light Metals, Materials Transactions, vol. 43, No. 5, 2002, pp. 1146-1152.
Fischer et al., "A Survey of Combustible Metals, Thermites, and Intermetallics for Pyrotechnic Applications," 32nd AIAA/ASME/SAE/ASEE Joint Propulsion Conference, Jul. 1-3, 1996, pp. 1-13.
Matsuura et al., "In-situ Joining of Nickel Monoaluminide to Iron by Reactive Sintering," 1998 ISIJ, ISIJ International, vol. 38, No. 3, 1998, pp. 310-315.
Zhang et al., "Al/Ni Multilayer Used as a Local Heat Source for Mounting Microelectronic Components," 2009 IEEE, 2009 International Conference on Electronic Packaging Technology & High Density Packaging (ICEPT-HDP), pp. 838-842.
Matsuura et al., "Joining of NiAl to Iron-Based Alloys by Reactive Casting," Metallurgical and Materials Transactions A, vol. 33A, Jul. 2002, pp. 2073-2080.
Matsuura et al., "Development of Freeform Fabrication of Intermetallic Compounds," 2001 Acta Metallurgica Inc., Scripta Mater. vol. 44, 2001, pp. 539-544.
Grieseler et al., "Bonding of low temperature co-fired ceramics to copper and to ceramic blocks by reactive aluminum/nicke multilayers," 2011 Wiley-VCH Verlag GmbH & Co., Phys. Status Solidi A, vol. 209, No. 3, 2012, pp. 512-518.
Yen et al., "Reactive Metals in Explosives," Propellants, Explosives, Pyrotechnics, vol. 37, No. 3, 2012, pp. 143-155 (abstract only).
International Search Report and Written Opinion from International Application No. PCT/US2014/059735, dated Jan. 26, 2015.
Matsuura et al., "Joining and Coating of Intermetallic Compounds to Metallic Materials by Reactive Casting," International Journal of Self-Propagating High-Temperature Synthesis, vol. 12, No. 3, 2003, pp. 223-237.
Matsuura et al., "Use of SHS Reaction Between Powder and Droplets for Coating, Welding and Freeform Fabrication of Intermetallics," Materials Science Forum, vols. 426-432, 2003, pp. 4271-4276.
"Field Welding Alternatives," Modern Railroads, Aug. 1987, vol. 42, No. 8, pp. 3, 39-40.

* cited by examiner

MULTIFUNCTIONAL REACTIVE INKS, METHODS OF USE AND MANUFACTURE THEREOF

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to three-dimensional (3D) printing and fabrication, and more particularly to 3D printing and fabrication using extrusion techniques and ink compositions capable of completing a self-propagating and/or self-sustaining reaction upon initiation thereof.

BACKGROUND 3D printing is an emerging field within the modern manufacturing industry. The technology has garnered serious attention, and commercial entities are even opening access to 3D printing hardware for public use to manufacture custom goods. While the technique is revolutionary, there remains much development and opportunity for improving and expanding the application of the technique across a broader range of applications.

A major obstacle to diversifying the applicability of 3D printing techniques, and particularly extrusion-based printing techniques, is limitations on available materials suitable for use with the technique. Conventional extrusion-based 3D printing techniques utilize polymer-based materials such as polycarbonate (PC) and/or acrylonitrile butadiene styrene (ABS). The material is typically filamentous in form, and is fed toward and through a heated nozzle, which melts the material and deposits a melted "bead" on a substrate.

This configuration and technique is limiting. There is no suitable use in extruding liquid-based materials (e.g. slurries, suspensions, solutions, etc.) into arbitrary 3D dimensions because such materials lack strength and will flow too freely upon extrusion. Further, the application of heat to the material at the nozzle precludes using conventional extrusion techniques with energetic materials, such as reactive inks comprising thermite constituents (or any other constituents tending to generate an undesirable reaction or prematurely initiate a desired reaction upon the nozzle applying heat).

Accordingly, it would be beneficial to provide systems, methods, and materials expanding the applicability of conventional 3D printing techniques to new materials such as reactive inks. It would be further beneficial to determine additional techniques for using such reactive inks in new applications such as custom repair and modification of existing materials in nearly any environment, use of reactive inks to provide localized heating to a target, and synthesis of new materials and/or systems using reactive inks.

SUMMARY

In one embodiment, a material includes a plurality of particles, a solvent system and one or more stabilizing agents; the particles are configured to complete a self-propagating and/or self-sustaining reaction upon initiation thereof.

In another embodiment, a method includes dispersing a plurality of particles in solution to form a dispersion and adding a stabilizing agent to the dispersion in an amount sufficient to cause the dispersion to exhibit one or more predetermined rheological properties; the particles in the dispersion are configured to complete a self-propagating and/or self-sustaining reaction upon initiation thereof.

In still another embodiment, a method includes depositing a material on a substrate; the material includes a plurality of particles configured to complete a self-propagating and/or self-sustaining reaction upon initiation thereof, a solvent system and one or more stabilizing agents.

Other aspects and advantages of the present invention will become apparent from the following detailed description, which, when taken in conjunction with the drawings, illustrate by way of example the principles of the invention.

DETAILED DESCRIPTION

Figure 1:
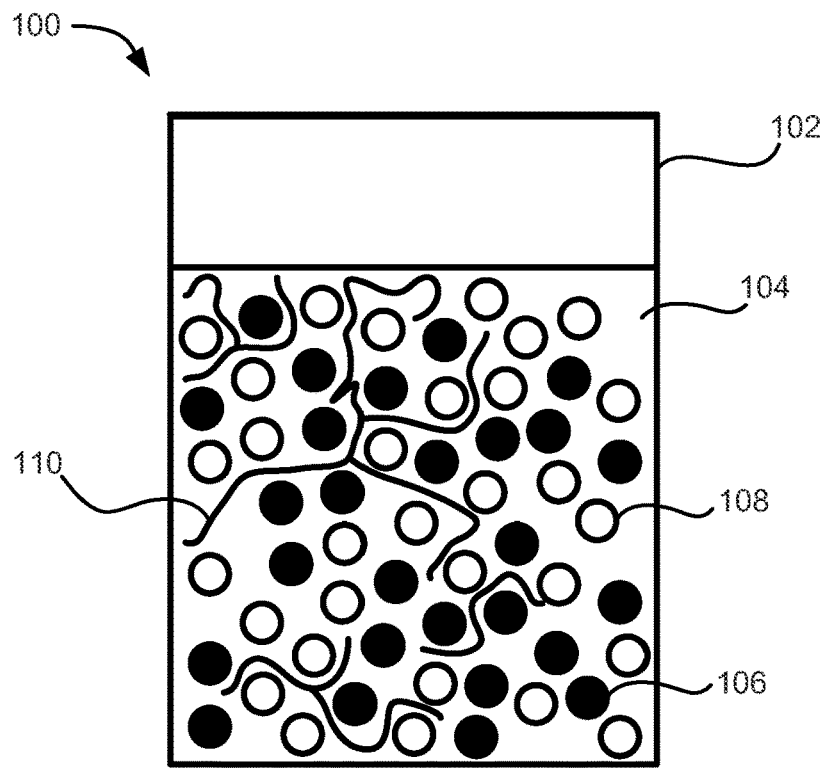
FIG. 1 schematically depicts a reactive ink composition prior to extrusion and deposition on a substrate, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of high-surface area catalysts having high activity and thermal stability over a broad temperature range and/or methods of making the same.

In one general embodiment, a material includes a plurality of particles, a solvent system and one or more stabilizing agents; the particles are configured to complete a self-propagating and/or self-sustaining reaction upon initiation thereof.

In another general embodiment, a method includes dispersing a plurality of particles in solution to form a dispersion and adding a stabilizing agent to the dispersion in an amount sufficient to cause the dispersion to exhibit one or more predetermined rheological properties; the particles in the dispersion are configured to complete a self-propagating and/or self-sustaining reaction upon initiation thereof.

In still another general embodiment, a method includes depositing a material on a substrate; the material includes a plurality of particles configured to complete a self-propagating and/or self-sustaining reaction upon initiation thereof, a solvent system and one or more stabilizing agents.

As understood herein, a "reactive ink" is a formulation of two or more different constituents, which, upon initiation, carries a self-propagating and/or self-sustaining reaction to completion.

A reactive ink, as disclosed herein and as compared to liquid-based materials such as slurries, suspensions, solutions, etc., is designed to have internally-provided structural strength, such that the ink retains its filamentary geometry upon extrusion. In various embodiments, the presently described inks can therefore support their own weight and be printed into three-dimensional objects, and also can span lengths to some distance without additional structural support being provided to the printed ink.

Moreover, in some embodiments the reactive ink may comprise constituents for a thermite or intermetallic reaction. Upon reaction, thermite or intermetallic composites undergo high-temperature reactions and yield a product phase in-place. A reactive ink could thus be printed onto a substrate, or into an arbitrary volume, and then reacted. The reaction would serve as a localized source to provide controlled heating to adjacent material. Furthermore, a product phase will form in-place of the printed material, and can be used to restore some functionality to a part (i.e. strength, electrical conductivity, thermal barrier). Due to the high reaction temperatures, little to no thermal post-processing with external heat sources will be required. Since the thermal stresses during the reaction will be a direct function of the reaction exothermicity as well as the printed feature size, a user will have control over the temperature history in the sample. This provides additional advantages over traditional techniques such as welding, in which a much larger volume of material is subjected to heating and the resultant thermal stresses. Unlike welding, a reactive ink is even compatible with temperature-sensitive materials, due to the fact that the user controls the energy deposition by controlling the formulation and feature sizes.

Moreover still, since a reactive ink can be delivered to a target fluidically, it is possible to use this technique in harmful or unreachable situations (e.g. to directly synthesize and/or repair parts of the International Space Station, satellites, deep-sea pipelines and/or equipment, etc.). Delivery of the ink can occur via a host of techniques including, but not limited to, a hand-held syringe, a caulking gun, a 3D printing apparatus with precision positioning capabilities, or a programmable robotic arm. The delivery method will depend on the particular application, and what feature resolution and amount of material is needed.

Preferably, the reactive inks disclosed herein are deliverable via fluidic systems as simple as a syringe and as complex as modern 3D printing apparatuses. Accordingly, reactive inks disclosed herein comprise at least one liquid or flowable component to enable fluidic delivery of the reactive ink.

More preferably, upon completing the self-propagating and/or self-sustaining reaction, the reactive inks discussed herein form a fully functional composite material or product. In other words, the structure formed from reacting the reactive ink is either fully functional in a capacity filled by the substrate onto which the ink was printed before incurring damage, or the structure formed from reacting the reactive ink is fully functional in a capacity for which it was designed. The former is usually the case for embodiments described herein having to do with repairing existing materials, while the latter is usually the case for materials formed from reactive inks using reactive additive manufacturing.

Reactive Ink Formulation

Turning now to the Figures, FIG. 1 depicts an exemplary schematic of a system 100 having a reactive ink formulation prior to printing/extrusion/deposition, according to one embodiment within the scope of the present inventive concepts. As shown in FIG. 1, the reactive ink is in a container 102, and comprises a plurality of particles 106, 108 dispersed in a solvent system 104 with one or more stabilizing agents 110. The plurality of particles 106, 108 preferably includes particles of at least two different types, creating a binary-order (or higher, e.g. tertiary, quaternary, etc.) reactive system of particles 106, 108 capable of carrying a self-propagating and/or self-sustaining reaction to completion upon initiation thereof.

While in some embodiments it may be sufficient to use a binary-order reactive system, for example to repair a damaged substrate, in various embodiments the presently disclosed multifunctional reactive inks may include higher-order reactive systems designed to simultaneously confer multiple functional properties and/or physical characteristics upon completion of the self-propagating and/or self-sustaining reaction.

In preferred approaches, the particles comprise anywhere from about 30 vol % to about 80 vol % of the multifunctional reactive ink formulation; in more preferred approaches, from about 40 vol % to about 60 vol % of the multifunctional reactive ink formulation; and in particularly preferred approaches, from about 45 vol % to about 55 vol % of the multifunctional reactive ink formulation.

For example, the particles may include at least two different precursor materials for forming a glass, an alloy, a ceramic, a cermet, etc. as would be understood by one having ordinary skill in the art upon reading the present descriptions. The precursor materials may be configured and/or arranged in the reactive ink so as to form the corresponding final material upon initiation of, during propagation of, and/or upon completion of a self-propagating and/or self-sustaining reaction. The particles are preferably configured to carry such reaction to completion upon initiation thereof.

In more exotic formulations, particles may be disposed in a liquid metal of a type different than the particles, and preferably the combination of the particles and the liquid metal are configured to carry a self-propagating and/or self-sustaining reaction to completion. More specifically, the particles may be disposed throughout a liquid matrix, in one approach.

In still more embodiments, instead of, or in addition to particles designed to carry a self-propagating reaction to completion, a multifunctional reactive ink formulation may include multiple molecular precursors of a reactive material.

In various approaches, the plurality of particles may include any combination of particle types which, upon initiation, can support a self-propagating and/or self-sustaining reaction. A partial list of combustible or reactive binary composite materials is shown in Table 1. In some formulations, ternary (or greater) mixtures can be utilized to specifically tailor the rate of energy release, as well as the properties of the reacted product, among any equivalent thereof that would be known to one having ordinary skill in the art upon reading the present descriptions. Of course, the plurality of particles may also include any number of combinations listed in Table 1, in more approaches. Those having ordinary skill in the art will appreciate the reaction schema listed in Table 1 to be stoichiometric formulae, such that the integer values appearing before the various constituent materials listed refer to a stoichiometric ratio of the respective constituents in the corresponding reaction. Thus, the first reaction listed in Table 1 could be rewritten as "2Al+3AgO." There are several other parameters, not captured in Table 1, which are well known to affect the reactivity within a given composition, and will also affect the characteristics of the product. Some examples include particle size, particle morphology, equivalence ratio, density, any others which would be known to those having ordinary skill in the art of reactive materials.

In particularly preferred embodiments, the particles comprise either: a combination of aluminum and nickel (Al+Ni), a combination of titanium and nickel (Ti+Ni), a combination of boron carbide and titanium ($B_4C$+Ti), or any combination thereof, e.g. [(Al+Ni),±(Ti+Ni),±($B_4C$+Ti)].

TABLE 1

Exemplary Self-Propagating and/or Self-Sustaining Reactions

| Constituents | | Reaction Type |
|---|---|---|
| 2Al | 3AgO | Thermite Reaction |
| 2Al | $3Ag_2O$ | Thermite Reaction |
| 2Al | $Bi_2O_3$ | Thermite Reaction |
| 2Al | 3CoO | Thermite Reaction |
| 8Al | $3Co_3O_4$ | Thermite Reaction |
| 2Al | $Cr_2O_3$ | Thermite Reaction |
| 2Al | 3CuO | Thermite Reaction |
| 2Al | $3Cu_2O$ | Thermite Reaction |
| 2Al | $Fe_2O_3$ | Thermite Reaction |
| 8Al | $3Fe_3O_4$ | Thermite Reaction |
| 2Al | 3HgO | Thermite Reaction |
| 10Al | $3I_2O_5$ | Thermite Reaction |
| 4Al | $3MnO_2$ | Thermite Reaction |
| 2Al | $MoO_3$ | Thermite Reaction |
| 10Al | $3Nb_2O_5$ | Thermite Reaction |
| 2Al | 3NiO | Thermite Reaction |
| 2Al | $Ni_2O_3$ | Thermite Reaction |
| 2Al | 3PbO | Thermite Reaction |
| 4Al | $3PbO_2$ | Thermite Reaction |
| 8Al | $3Pb_3O_4$ | Thermite Reaction |
| 2Al | 3PdO | Thermite Reaction |
| 4Al | $3SiO_2$ | Thermite Reaction |
| 2Al | 3SnO | Thermite Reaction |
| 4Al | $3SnO_2$ | Thermite Reaction |
| 10Al | $3Ta_2O_5$ | Thermite Reaction |
| 4Al | $3TiO_2$ | Thermite Reaction |
| 16Al | $3U_3O_8$ | Thermite Reaction |
| 10Al | $3V_2O_5$ | Thermite Reaction |
| 4Al | $3WO_2$ | Thermite Reaction |
| 2Al | $WO_3$ | Thermite Reaction |
| 2B | $Cr_2O_3$ | Thermite Reaction |
| 2B | 3CuO | Thermite Reaction |
| 2B | $Fe_2O_3$ | Thermite Reaction |
| 8B | $3Fe_3O_4$ | Thermite Reaction |
| 4B | $3MnO_2$ | Thermite Reaction |
| 8B | $3Pb_3O_4$ | Thermite Reaction |
| 3Be | $B_2O_3$ | Thermite Reaction |
| 3Be | $Cr_2O_3$ | Thermite Reaction |
| Be | CuO | Thermite Reaction |
| 3Be | $Fe_2O_3$ | Thermite Reaction |
| 4Be | $Fe_3O_4$ | Thermite Reaction |
| 2Be | $MnO_2$ | Thermite Reaction |
| Be | $PbO_2$ | Thermite Reaction |
| 4Be | $Pb_3O_4$ | Thermite Reaction |
| 2Be | $SiO_2$ | Thermite Reaction |
| 3Hf | $2B_2O_3$ | Thermite Reaction |
| 3Hf | $2Cr_2O_3$ | Thermite Reaction |

TABLE 1-continued

Exemplary Self-Propagating and/or Self-Sustaining Reactions

| Constituents | | Reaction Type |
|---|---|---|
| Hf | 2CuO | Thermite Reaction |
| 3Hf | $2Fe_2O_3$ | Thermite Reaction |
| 2Hf | $Fe_3O_4$ | Thermite Reaction |
| Hf | $MnO_2$ | Thermite Reaction |
| 2Hf | $Pb_3O_4$ | Thermite Reaction |
| Hf | $SiO_2$ | Thermite Reaction |
| 2La | 3AgO | Thermite Reaction |
| 2La | 3CuO | Thermite Reaction |
| 2La | $Fe_2O_3$ | Thermite Reaction |
| 2La | 3HgO | Thermite Reaction |
| 10La | $3I_2O_5$ | Thermite Reaction |
| 4La | $3MnO_2$ | Thermite Reaction |
| 2La | 3PbO | Thermite Reaction |
| 4La | $3PbO_2$ | Thermite Reaction |
| 8La | $3Pb_3O_4$ | Thermite Reaction |
| 2La | 3PdO | Thermite Reaction |
| 4La | $3WO_2$ | Thermite Reaction |
| 2La | $WO_3$ | Thermite Reaction |
| 6Li | $B_2O_3$ | Thermite Reaction |
| 6Li | $Cr_2O_3$ | Thermite Reaction |
| 2Li | CuO | Thermite Reaction |
| 6Li | $Fe_2O_3$ | Thermite Reaction |
| 8Li | $Fe_3O_4$ | Thermite Reaction |
| 4Li | $MnO_2$ | Thermite Reaction |
| 6Li | $MoO_3$ | Thermite Reaction |
| 8Li | $Pb_3O_4$ | Thermite Reaction |
| 4Li | $SiO_2$ | Thermite Reaction |
| 6Li | $WO_3$ | Thermite Reaction |
| 3Mg | $B_2O_3$ | Thermite Reaction |
| 3Mg | $Cr_2O_3$ | Thermite Reaction |
| Mg | CuO | Thermite Reaction |
| 3Mg | $Fe_2O_3$ | Thermite Reaction |
| 4Mg | $Fe_3O_4$ | Thermite Reaction |
| 2Mg | $MnO_2$ | Thermite Reaction |
| 4Mg | $Pb_3O_4$ | Thermite Reaction |
| 2Mg | $SiO_2$ | Thermite Reaction |
| 2Nd | 3AgO | Thermite Reaction |
| 2Nd | 3CuO | Thermite Reaction |
| 2Nd | 3HgO | Thermite Reaction |
| 10Nd | $3I_2O_5$ | Thermite Reaction |
| 4Nd | $3MnO_2$ | Thermite Reaction |
| 4Nd | $3PbO_2$ | Thermite Reaction |
| 8Nd | $3Pb_3O_4$ | Thermite Reaction |
| 2Nd | 3PdO | Thermite Reaction |
| 4Nd | $3WO_2$ | Thermite Reaction |
| 2Nd | $WO_3$ | Thermite Reaction |
| 2Ta | 5AgO | Thermite Reaction |
| 2Ta | 5CuO | Thermite Reaction |
| 6Ta | $5Fe_2O_3$ | Thermite Reaction |
| 2Ta | 5HgO | Thermite Reaction |
| 2Ta | $I_2O_5$ | Thermite Reaction |
| 2Ta | 5PbO | Thermite Reaction |
| 4Ta | $5PbO_2$ | Thermite Reaction |
| 8Ta | $5Pb_3O_4$ | Thermite Reaction |
| 2Ta | 5PdO | Thermite Reaction |
| 4Ta | $5WO_2$ | Thermite Reaction |
| 6Ta | $5WO_3$ | Thermite Reaction |
| 3Th | $2B_2O_3$ | Thermite Reaction |
| 3Th | $2Cr_2O_3$ | Thermite Reaction |
| Th | 2CuO | Thermite Reaction |
| 3Th | $2Fe_2O_3$ | Thermite Reaction |
| 2Th | $Fe_3O_4$ | Thermite Reaction |
| Th | $MnO_2$ | Thermite Reaction |
| Th | $PbO_2$ | Thermite Reaction |
| 2Th | $Pb_3O_4$ | Thermite Reaction |
| Th | $SiO_2$ | Thermite Reaction |
| 3Ti | $2B_2O_3$ | Thermite Reaction |
| 3Ti | $2Cr_2O_3$ | Thermite Reaction |
| Ti | 2CuO | Thermite Reaction |
| 3Ti | $2Fe_2O_3$ | Thermite Reaction |
| Ti | $Fe_3O_4$ | Thermite Reaction |
| Ti | $MnO_2$ | Thermite Reaction |
| 2Ti | $Pb_3O_4$ | Thermite Reaction |
| Ti | $SiO_2$ | Thermite Reaction |
| 2Y | 3CuO | Thermite Reaction |
| 8Y | $3Fe_3O_4$ | Thermite Reaction |

TABLE 1-continued

Exemplary Self-Propagating and/or Self-Sustaining Reactions

| Constituents | | Reaction Type |
|---|---|---|
| 10Y | $3I_2O_5$ | Thermite Reaction |
| 4Y | $3MnO_2$ | Thermite Reaction |
| 2Y | $MoO_3$ | Thermite Reaction |
| 2Y | $Ni_2O_3$ | Thermite Reaction |
| 4Y | $3PbO_2$ | Thermite Reaction |
| 2Y | 3PdO | Thermite Reaction |
| 4Y | $3SnO_2$ | Thermite Reaction |
| 10Y | $3Ta_2O_5$ | Thermite Reaction |
| 10Y | $3V_2O_5$ | Thermite Reaction |
| 2Y | $WO_3$ | Thermite Reaction |
| 3Zr | $2B_2O_3$ | Thermite Reaction |
| 3Zr | $2Cr_2O_3$ | Thermite Reaction |
| Zr | 2CuO | Thermite Reaction |
| 3Zr | $2Fe_2O_3$ | Thermite Reaction |
| 2Zr | $Fe_3O_4$ | Thermite Reaction |
| Zr | $MnO_2$ | Thermite Reaction |
| 2Zr | $Pb_3O_4$ | Thermite Reaction |
| Zr | $SiO_2$ | Thermite Reaction |
| Al | 2B | Intermetallic Reaction |
| 4Al | 3C | Intermetallic Reaction |
| 2Al | Ca | Intermetallic Reaction |
| 4Al | Ca | Intermetallic Reaction |
| 4Al | Ce | Intermetallic Reaction |
| Al | Co | Intermetallic Reaction |
| 4Al | Co | Intermetallic Reaction |
| 5Al | 2Co | Intermetallic Reaction |
| 3Al | Cr | Intermetallic Reaction |
| Al | Cu | Intermetallic Reaction |
| Al | Fe | Intermetallic Reaction |
| 3Al | Fe | Intermetallic Reaction |
| 4Al | La | Intermetallic Reaction |
| Al | Li | Intermetallic Reaction |
| Al | Mn | Intermetallic Reaction |
| Al | Ni | Intermetallic Reaction |
| Al | 3Ni | Intermetallic Reaction |
| Al | Pd | Intermetallic Reaction |
| 4Al | Pr | Intermetallic Reaction |
| Al | Pt | Intermetallic Reaction |
| 4Al | Pu | Intermetallic Reaction |
| 2Al | 3S | Intermetallic Reaction |
| Al | Ta | Intermetallic Reaction |
| 3Al | Ta | Intermetallic Reaction |
| Al | Ti | Intermetallic Reaction |
| Al | 3Ti | Intermetallic Reaction |
| 2Al | Ti | Intermetallic Reaction |
| 3Al | Ti | Intermetallic Reaction |
| 3Al | 2Ti | Intermetallic Reaction |
| 4Al | U | Intermetallic Reaction |
| 3Al | V | Intermetallic Reaction |
| 2Al | Zr | Intermetallic Reaction |
| 4B | C | Intermetallic Reaction |
| 6B | Ce | Intermetallic Reaction |
| 2B | Cr | Intermetallic Reaction |
| 2B | Hf | Intermetallic Reaction |
| 6B | La | Intermetallic Reaction |
| 2B | Mg | Intermetallic Reaction |
| 6B | Mg | Intermetallic Reaction |
| 2B | Mn | Intermetallic Reaction |
| 2B | Mo | Intermetallic Reaction |
| 2B | Nb | Intermetallic Reaction |
| 6B | Sm | Intermetallic Reaction |
| 6B | Si | Intermetallic Reaction |
| 2B | Ta | Intermetallic Reaction |
| 4B | Th | Intermetallic Reaction |
| B | Ti | Intermetallic Reaction |
| 2B | Ti | Intermetallic Reaction |
| 2B | U | Intermetallic Reaction |
| 4B | U | Intermetallic Reaction |
| B | V | Intermetallic Reaction |
| 2B | V | Intermetallic Reaction |
| 5B | 2W | Intermetallic Reaction |
| 6B | Y | Intermetallic Reaction |
| 2B | Zr | Intermetallic Reaction |
| 3Ba | 2Bi | Intermetallic Reaction |
| Ba | 2C | Intermetallic Reaction |
| 2Ba | Pb | Intermetallic Reaction |
| 3Ba | 2Sb | Intermetallic Reaction |
| 2Ba | Sn | Intermetallic Reaction |
| Be | 2C | Intermetallic Reaction |
| 2Be | C | Intermetallic Reaction |
| 5Be | Nb | Intermetallic Reaction |
| 13Be | Pu | Intermetallic Reaction |
| 13Be | U | Intermetallic Reaction |
| Bi | K | Intermetallic Reaction |
| Bi | 3K | Intermetallic Reaction |
| Bi | Li | Intermetallic Reaction |
| 2C | Ca | Intermetallic Reaction |
| 2C | Ce | Intermetallic Reaction |
| 3C | 7Cr | Intermetallic Reaction |
| C | Hif | Intermetallic Reaction |
| 2C | La | Intermetallic Reaction |
| 3C | 7Mn | Intermetallic Reaction |
| C | 2Mo | Intermetallic Reaction |
| 2C | 2Na | Intermetallic Reaction |
| 0.98C | Nb | Intermetallic Reaction |
| C | Nb | Intermetallic Reaction |
| C | 2Nb | Intermetallic Reaction |
| C | Si | Intermetallic Reaction |
| 2C | Sr | Intermetallic Reaction |
| C | Ta | Intermetallic Reaction |
| 1.94C | Th | Intermetallic Reaction |
| 2C | Th | Intermetallic Reaction |
| C | Ti | Intermetallic Reaction |
| C | U | Intermetallic Reaction |
| 2C | U | Intermetallic Reaction |
| C | V | Intermetallic Reaction |
| C | W | Intermetallic Reaction |
| C | Zr | Intermetallic Reaction |
| Ca | 2Mg | Intermetallic Reaction |
| 2Ca | Pb | Intermetallic Reaction |
| Ca | Si | Intermetallic Reaction |
| Ca | Sn | Intermetallic Reaction |
| 2Ca | Sn | Intermetallic Reaction |
| 11Cd | Pu | Intermetallic Reaction |
| Ce | Mg | Intermetallic Reaction |
| 2Ce | Pb | Intermetallic Reaction |
| Ce | 2Si | Intermetallic Reaction |
| Ce | Zn | Intermetallic Reaction |
| Co | Si | Intermetallic Reaction |
| Cr | Si | Intermetallic Reaction |
| Cr | 2Si | Intermetallic Reaction |
| 3Cr | Si | Intermetallic Reaction |
| 5Cr | 3Si | Intermetallic Reaction |
| Cu | 2Mg | Intermetallic Reaction |
| 2Cu | Mg | Intermetallic Reaction |
| Cu | Pd | Intermetallic Reaction |
| Fe | Si | Intermetallic Reaction |
| Ge | 2Mg | Intermetallic Reaction |
| 2Ge | Nb | Intermetallic Reaction |
| Li | Pb | Intermetallic Reaction |
| Li | Sb | Intermetallic Reaction |
| Li | Sn | Intermetallic Reaction |
| Mg | S | Intermetallic Reaction |
| 3Mg | 2Sb | Intermetallic Reaction |
| Mg | Se | Intermetallic Reaction |
| 2Mg | Si | Intermetallic Reaction |
| 2Mg | Sn | Intermetallic Reaction |
| Mg | Te | Intermetallic Reaction |
| 2Mg | Th | Intermetallic Reaction |
| Mg | U | Intermetallic Reaction |
| Mg | Y | Intermetallic Reaction |
| Mn | S | Intermetallic Reaction |
| Mn | Si | Intermetallic Reaction |
| Mn | 1.7Si | Intermetallic Reaction |
| Mo | 2Si | Intermetallic Reaction |
| Mo | 7Si | Intermetallic Reaction |
| 3Mo | Si | Intermetallic Reaction |
| 5Mo | 3Si | Intermetallic Reaction |
| Na | Sb | Intermetallic Reaction |
| Na | Sn | Intermetallic Reaction |
| Nb | Ni | Intermetallic Reaction |
| Nb | 2Si | Intermetallic Reaction |

TABLE 1-continued

Exemplary Self-Propagating and/or Self-Sustaining Reactions

| Constituents | | Reaction Type |
|---|---|---|
| 5Nb | 3Si | Intermetallic Reaction |
| Ni | Si | Intermetallic Reaction |
| Pd | Sn | Intermetallic Reaction |
| Pu | 12Zn | Intermetallic Reaction |
| S | Zn | Intermetallic Reaction |
| Si | 2Ta | Intermetallic Reaction |
| 2Si | Ta | Intermetallic Reaction |
| 3Si | 5Ta | Intermetallic Reaction |
| 2Si | Th | Intermetallic Reaction |
| 2Si | Ti | Intermetallic Reaction |
| 3Si | 5Ti | Intermetallic Reaction |
| 2Si | U | Intermetallic Reaction |
| 2Si | V | Intermetallic Reaction |
| 2Si | W | Intermetallic Reaction |
| Si | Y | Intermetallic Reaction |
| Si | 2Zr | Intermetallic Reaction |
| 2Si | Zr | Intermetallic Reaction |
| 3Si | 5Zr | Intermetallic Reaction |
| 2U | 17Zn | Intermetallic Reaction |
| 2Zn | Zr | Intermetallic Reaction |

In other embodiments, rather than two types of particles, a multifunctional reactive ink may include one type of particles coated with another type of material, for example aluminum particles plated with nickel, resulting in essentially a core-shell or laminate configuration, particles of a composite and/or alloyed material, etc. as would be understood by those having ordinary skill in the art upon reading the present descriptions.

In various embodiments, the particles may be characterized by an average particle diameter in a range from about 0.01 microns to about 100 microns. Small particle size is advantageous to facilitating a self-propagating and/or self-sustaining reaction and a relatively fast reaction rate, because particles may be more homogenously dispersed throughout the multifunctional reactive ink and further due at least in part to a relatively reactive higher surface area throughout the multifunctional reactive ink. Particle size will also have an impact on the effective heating and/or cooling rate, which may result in different grain sizes of the product, or may result in other features which can impact the properties of the product.

Turning now to the solvent system 104, in preferred embodiments the solvent system comprises solvents having a low viscosity and a high-to-moderate boiling point (e.g. in a range from about 50 to about 100 degrees)° C. to facilitate quick, efficient, facile evaporation thereof during and/or after depositing the multifunctional reactive ink on a substrate. In particularly preferred embodiments, the solvent system 104, optionally in conjunction with the stabilizer(s) 110, is present in an effective amount such that the material is structurally self-supporting during deposition. For example, the material could be deposited vertically onto itself to form a substantially rod-like structure that would not collapse or deform significantly under its own weight. Of course, in various embodiments the material could be deposited so as to generate a three-dimensional structure in nearly any configuration.

In more embodiments, the solvent system may optionally include one or more relatively higher volatility solvents than those described immediately above. For example, in one approach employing graded volatility solvent systems reduces the drying rate and/or stresses associated with drying, which in turn helps reduce cracking and/or other deformities, artifacts, inclusions, etc. in the deposited/extruded reactive ink formulation. In such approaches, the solvent system may include one or more solvents characterized by a boiling point up to about 250° C.

In still more embodiments, the solvent system 104 is preferably configured to leave negligible amounts organic residue in the material after evaporation.

With continuing reference to FIG. 1, and turning now to the stabilizing agents 110, in preferred embodiments the one or more stabilizing agents are configured to prevent the particles from forming aggregates prior to completing the self-propagating and/or self-sustaining reaction. As discussed in further detail below, particularly with reference to FIG. 6, some or all particles 106, 108 suitable for use in the presently disclosed multifunctional reactive inks have a tendency to form aggregates in suspension due to weak interactions such as hydrogen bonds or Van der Waals forces. Aggregation is disadvantageous because it may interfere with extrusion (larger particles are more difficult to extrude consistently without blockage) and/or reaction propagation (due to inaccessibility of reaction components to other reaction components, undesirable stoichiometric ratio of accessible reaction components, etc.). Accordingly, it is advantageous to disperse particles and break up any aggregates in the multifunctional reactive ink formulation.

However, simply dispersing the particles is insufficient due to tendency to reform the aggregates. Accordingly, it is advantageous to include one or more stabilizing agents to prevent the particles from forming aggregates while in the ink. As discussed herein, "preventing" the (re)formation of aggregates should be understood to include generally exerting a degree of control over particles' natural tendency to form aggregates. "Preventing" the (re)formation of aggregates need not necessarily prevent the formation of any aggregates whatsoever, but may also include altering (e.g. substantially limiting or decreasing) particles' natural tendency to form aggregates under given environmental conditions.

All solid particles experience short range excluded volume repulsions, which does not prevent agglomeration due to longer range attractive forces such as Van der Waal's attractions. Particles may be physically separated using longer range repulsive forces such as steric interactions. Alternatively and/or additionally particles can be prevented from aggregating by manipulating electrostatic interactions between the particles. For instance, dispersed particles may be coated with a steric material to prevent subsequent re-aggregation. Alternatively and/or additionally, the chemical conditions of the particles in suspension may be modified (e.g. by changing pH, salt concentration, etc. of the solvent system) to influence the interaction of particles (e.g. by modifying surface charge).

In various approaches, the one or more stabilizing agents 110 may include any combination or single agent selected from a polymer, a surfactant, an acid, a base, an electrolyte, a polyelectrolyte and/or a salt. In preferred approaches the stabilizing agents 110 may include one or more of: polyvinylpyrridole (PVP), polyethylene glycol (PEG), citric acid, polyacrylic acid, sodium polyacrylate, polyethyleneimine, and ammonium polymethacrylate.

In various approaches, the stabilizing agents may be present in the reactive ink formulation in an amount greater than 0 vol % and less than about 15%, preferably greater than 0 vol % and less than about 10%, and more preferably greater than 0 vol % and less than about 1%.

In more embodiments, the reactive ink formulation may optionally and/or additionally include one or more gelation agents. A gelation agent may be added to controllably gel a stabilized ink formulation (e.g. a suspension) so that the formulation develops appropriate viscoelastic properties and solid-like behavior while not under shear stress. Conversely, under shear stress, formulations including a gelation agent or agent(s) may advantageously become more liquid-like which allows ease of flow through a nozzle. After the formulation comprising the gelation agent exits the nozzle, it will solidify or re-gel to maintain its shape, advantageously conferring additional structural support to the deposited/extruded formulation.

In some embodiments, the particles themselves may be employed as the gelation agent, and the desired flow properties may be achieved by adding an additional component such as a polyelectrolyte to influence the manner in which the particles physically interact, modifying the rheological properties of the overall reactive ink composition accordingly.

In the foregoing manner, it is possible to tailor the flow properties and solidification behavior in order to obtain inks that readily flow through fine nozzles without clogging, yet are self-supporting upon deposition. For example, the rheology of nanoparticle inks may be tuned by varying the ratio of stabilizing agent to gelation agent, or by altering the volumetric ratio of attractive to repulsive particles for a binary-order (or higher) system. The viscoelastic response can also be tuned so that the presently described reactive inks rapidly "set" upon exiting the nozzle and maintain their shape, allowing for construction of 3D architectures in a layer-by-layer fashion.

In still more approaches, the multifunctional reactive inks disclosed herein may include additional components, such as a humectant to draw moisture into the ink and/or a graded volatility solvent system such as described above. Adding a humectant may be particularly advantageous for multifunctional reactive inks utilizing aqueous solvents but having a tendency to dry too quickly, causing the ink to clog the nozzle during extrusion and/or negatively impacting the structural characteristics of the deposited ink.

Other additional components may include one or more adhesion and/or brazing agents to assist in adhering layers of deposited reactive ink material. For example, in one embodiment a multifunctional reactive ink may include nickel and aluminum particles designed to carry a self-propagating and/or self-sustaining reaction to completion upon initiation, in addition to silver nanoparticles designed to facilitate better adhesion of the resulting aluminum-nickel material to the substrate. Without wishing to be bound to any particular theory, the inventors propose generally that adding particles that can melt during reaction and facilitate wetting the substrate will improve adhesion. Other techniques for improving adhesion include enhancing inner diffusion of species and flow transport between the multifunctional reactive ink and the substrate material.

Figure 2:
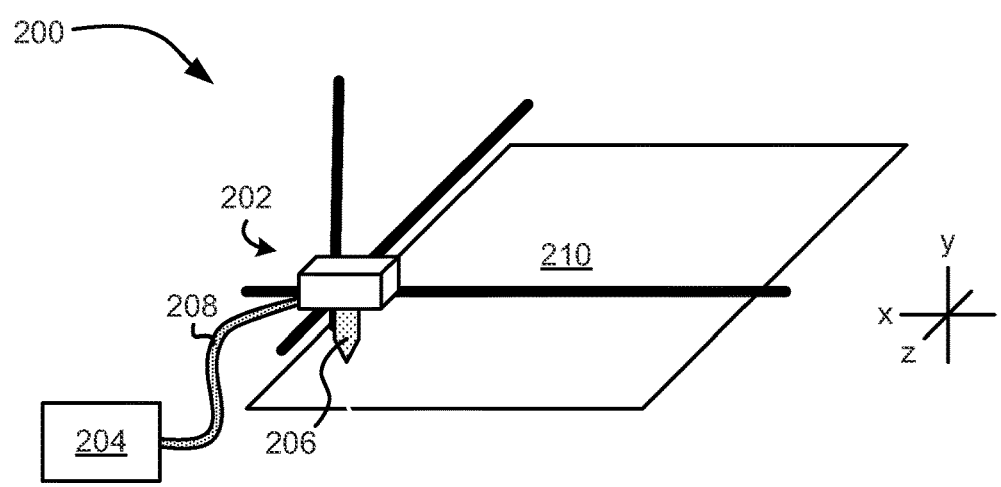
FIG. 2 is a simplified schematic of a 3D printing apparatus, according to one embodiment.

FIG. 2 is a simplified schematic of a 3D printing apparatus 200 suitable for use in printing multifunctional reactive ink as described herein, according to one embodiment.

As shown, the 3D printing apparatus 200 includes a three-dimensional printing apparatus 202 (white box coupled to a three-axis support), a reservoir 204 and a nozzle 206 coupled to the printing apparatus 202, and further coupled to the reservoir 204 via one or more fluidic channels 208.

In various embodiments, the positioning apparatus 202 is configured to translate the nozzle 206 in at least one dimension relative to a substrate 210. In FIG. 2, the positioning apparatus 202 is configured to translate the nozzle 206 in three linear dimensions (x, y, z) relative to the substrate 210.

Thus, the system depicted in FIG. 2 could translate the nozzle 206 throughout a three-dimensional Cartesian coordinate space in proximity to the substrate 210, depositing multifunctional reactive ink from the reservoir 204 via fluidic channel(s) 208 according to a predetermined pattern to form a custom three-dimensional structure capable of carrying out a self-propagating and/or self-sustaining reaction to completion upon initiation thereof.

In alternative embodiments, the positioning apparatus 202 may be configured to translate the nozzle 206 along rotational or radial axes in addition to linear axes. In still more embodiments, the positioning apparatus may be configured to translate the nozzle 206 along one or two axes (e.g. the x axis or x and y axes shown in FIG. 2) and the substrate 210 may be configured to translate along one or more additional axes to accomplish custom printing. For example, in one illustrative approach the nozzle 206 may be able to translate in the y direction, while the substrate is mounted on a positioning apparatus 202 configured to move the substrate in the x and z axes. In operation, the nozzle may be slowly drawn up as material is extruded onto the moving substrate to build the predetermined structure vertically, according to one embodiment.

In still more embodiments, the positioning apparatus may be coupled to the substrate 210 rather than the nozzle 206, which may be fixed. In principle the operation of the apparatus is substantially similar, with the positioning apparatus 202 translating the substrate 210 throughout a three-dimensional Cartesian coordinate space with reference to the fixed position of the nozzle 206 according to a predetermined pattern to form the desired three-dimensional structure.

Of course, as would be understood by one having ordinary skill in the art upon reading the present descriptions, multifunctional reactive inks disclosed herein may be printed without the assistance of complex machinery. For example, in one embodiment a reactive ink may be printed onto a substrate using a simple fluidic system, such as a system comprising a reservoir, a nozzle and a plunger (e.g. a syringe or caulk gun). This ability to print using minimal hardware makes the instantly disclosed multifunctional reactive inks far more accessible and applicable to custom applications. As no complex machinery is required, a user may simply direct the extrusion/deposition process by hand, enabling applications such as repair or modification of pre-existing structures without the use of any tool other than the simple fluidic system.

For example, one illustrative application enabled by this user-driven application process is to repair a tear in a piece of metal. Conventional 3D printing techniques would be ill-suited (if capable at all) for performing such tasks because the topology of the substrate, in this case the tear, (as well as the "proper" topology of the metal before tearing) is unknown and/or difficult to infer or calculate. A human user, however, could simply apply a multifunctional reactive ink by hand and initiate the corresponding reaction to effectively print a repaired part (albeit with less precision than a computer-driven method with precise knowledge of the substrate topology and desired topology).

Another illustrative use would be making repairs or modifications to a machine or component thereof in an extreme environment neither suitable for conventional repair techniques nor 3D printing. An aqueous environment, such as an oceanic pipeline, offshore rig, naval vessel, etc. may present unique difficulties such as the damaged component being submersed in an excellent heat-sink and the need to use dangerous electrical instruments in an aqueous environment. Multifunctional reactive inks could replace conventional hyperbaric welding to accomplish undersea repair without introducing risk of electrocution by simply printing the ink and initiating a reaction to heal the material. Similarly, welding-type activities could be carried out in an oxygen-free environment such as the vacuum of space because the multifunctional reactive ink may supply all necessary components of the corresponding reaction, enabling on-site repair of orbiting equipment.

Figure 5:
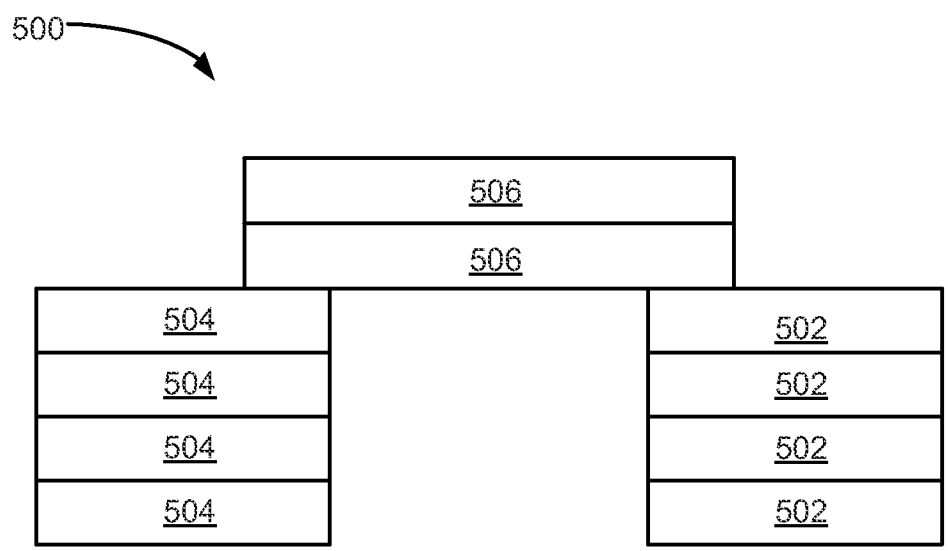
FIG. 5 shows a schematic representation of a structure custom-fabricated using reactive ink, according to one embodiment.
Figure 6:
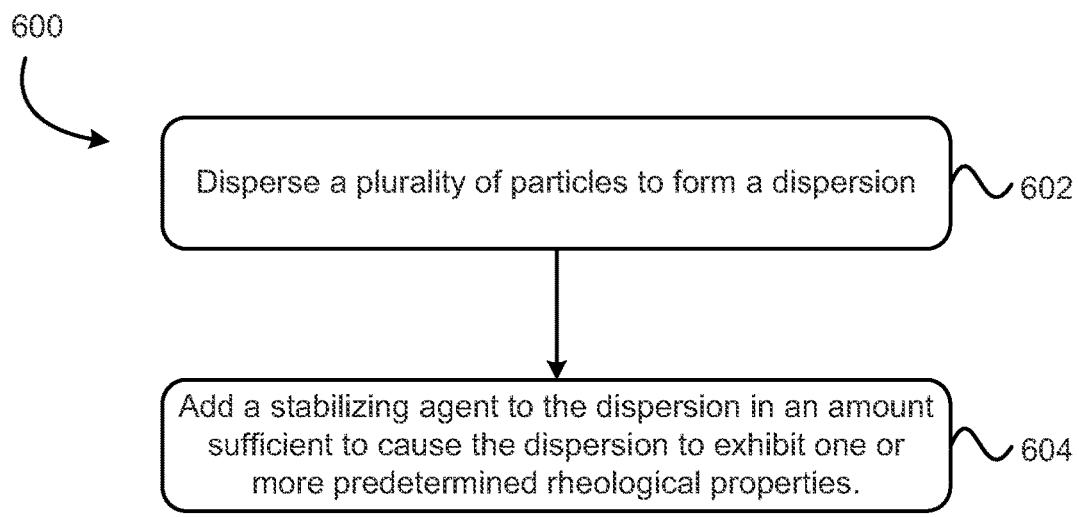
FIG. 6 is a flowchart of a method, according to one embodiment.

FIG. 6 is a flowchart of a method 600 for fabricating reactive ink commensurate in scope with the presently described inventive concepts, according to one embodiment. The method 600 may be performed in any suitable environment, including those shown in FIGS. 1-5, among others, in various approaches.

Method 600 includes operation 602, where a plurality of particles are dispersed in a solution to form a dispersion. The particles include at least two types of particles to form an at-least binary-order reactive system, such as particles 106, 108 as shown in FIG. 1 and described above. The particles are dispersed in method 600 to disaggregate clustered particles in order to facilitate even distribution thereof throughout the ultimate reactive ink formulation. The particles may be dispersed using any suitable technique, using mechanical and/or acoustic forces such as shaking, stirring, vortexing, (ultra)sonication, etc. as would be understood by one having ordinary skill in the art upon reading the present descriptions.

Dispersed particles, if left alone, have a tendency to re-form aggregates after dispersion due to attraction from weak interactions such as hydrogen bonds and/or Van der Waal's forces. In order to retard, or preferably defeat, the aggregation process, method 600 also includes operation 604, where one or more stabilizing agents are added to the dispersion. The stabilizing agents may be added in an amount sufficient to cause the dispersion to exhibit one or more rheological properties, e.g. viscosity, shear, storage and loss modulus, density, flow properties, volume fraction of particles, etc.

In preferred embodiments, this even distribution enables more consistent extrusion (e.g. because rheological properties are substantially identical for the entire formulation) and reaction propagation (e.g. because particles of each type are present throughout the entire ink formulation in a desired stoichiometric ratio and/or with a desired physical proximity to one another).

Further approaches may include additional and/or alternative operations to formulate the multifunctional reactive inks disclosed herein. For example, in some approaches method 600 may additionally include concentrating the multifunctional reactive ink. Concentration operations suitable for use in forming multifunctional reactive inks as discussed herein include, but are not limited to, evaporation-based techniques, sedimentation techniques, and separation techniques. For example, in some embodiments the multifunctional reactive ink formulation formed in operations 602-604 may be incubated at a predetermined temperature (e.g. 400 C) sufficiently low to avoid initiating any chemical reaction between the plurality of particles and sufficiently high to facilitate near-complete (e.g. 99%) evaporation of the solvent.

Additionally and/or alternatively, concentration may include allowing the dispersed particles to form a sediment on the bottom of a reservoir, and decanting/aspirating away the supernatant solvent. Sedimentation-based and separation-based concentration techniques may be supplemented by centrifugation, in some approaches.

Materials Repair

Figure 3A:
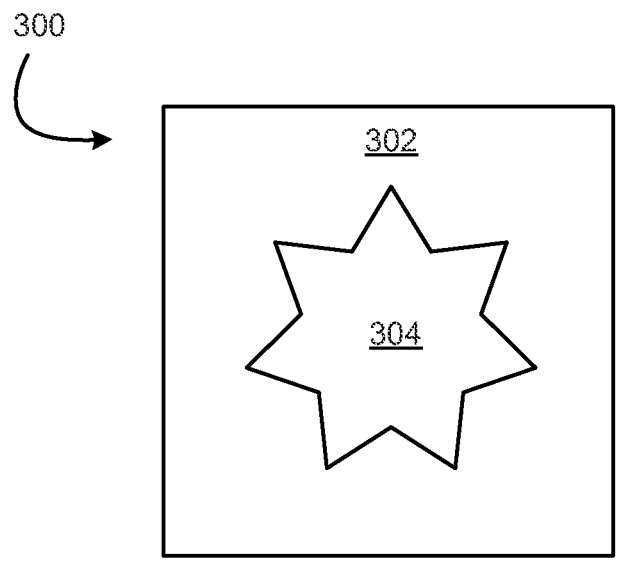
FIG. 3A is a simplified schematic of a damaged substrate, according to one embodiment.
Figure 3B:
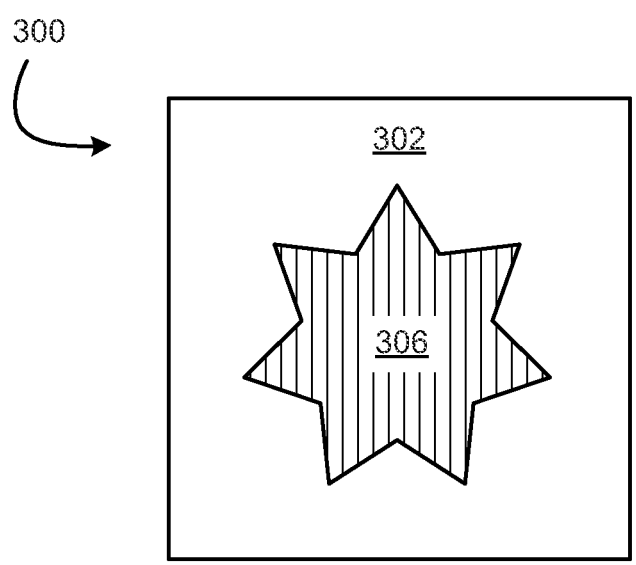
FIG. 3B is a schematic representation of a repaired substrate, according to one embodiment.

Referring now to FIGS. 3A-3B, we turn to describing an exemplary embodiment of using multifunctional reactive inks as described herein to repair materials. In the illustrative scenario, a device includes component 300 comprising a substrate 302 having incurred physical damage in a region 304. Physical damage may include any type of damage, including tears, holes, alterations to chemical makeup of the substrate (e.g. due to reduction-oxidation reactions, radiation, etc.), physical distortion of the substrate, etc. as would be understood by one having ordinary skill in the art upon reading the present descriptions.

In order to effectively repair the substrate 302, the damaged region 304 is at least partially filled with a multifunctional reactive ink according to any method described herein, or any equivalent thereof. The reactive ink is then initiated, and the self-propagating and/or self-sustaining reaction proceeds to completion, resulting in the damaged region 304 of substrate 302 being filled/repaired, as indicated in FIG. 3B by repaired region 306.

Similarly, in other applications a reactive ink may be employed to repair a conductive component to restore conductivity thereto. For example, with reference again to FIGS. 3A-3B, region 304 may reside in the path of a printed circuit, e.g. on a printed circuit board (PCB). Damage in region 304 may have broken the conductive path through the circuit, and a reactive ink configured to form a conductive composite upon reaction may be printed in the damaged region. After reaction, the damaged region 304 may be filled in whole or in part by the composite 306 formed by the reactive ink, and conductivity thereby restored to the circuit.

Still more similar applications include using the reactive inks as a type of switch in an arming device. Continuing with the PCB example above, a PCB arming component of a device may utilize a printed circuit comprising unreacted reactive ink configured to form a conductive composite, and the PCB may further include some initiation device to create a spark, heat, etc. for initiating the reaction. After reacting the multifunctional ink, the PCB comprises a conductive path for carrying electricity, e.g. to a detonator.

In still more embodiments, repair may include strengthening the substrate material. For example, the reactive ink material be composed of perhaps more exotic materials than the part itself, the exotic materials conferring superior mechanical properties or better performance than the rest of the material itself so the repaired region of the material is not actually the weakest portion thereof.

For instance, in one embodiment the repaired region may be titanium diboride formed by reacting a multifunctional reactive ink comprising constituents of titanium and boron, and the formulation may be used to repair or reinforce structural steel. The original part may not be comprised of titanium diboride because it was cost-prohibitive to use in de-novo fabrication. However, advantageously reactive ink printing is more cost-effective because it is possible to direct and print this material exactly where needed, restoring strength to some percentage of the original part's value (according to any standard technique of measuring mechanical strength) and that may even be over 100 percent of the original value.

Reactive Additive Manufacturing

Figure 7:
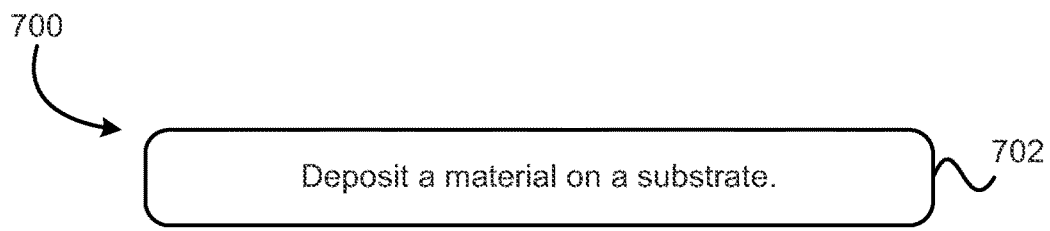
FIG. 7 is a flowchart of a method, according to one embodiment.

FIG. 7 depicts a flowchart of a method 700 for fabricating materials using reactive additive manufacturing, according to one embodiment. The method 700 may be performed in any suitable environment, such as those depicted in FIGS. 1-5, among others, in various approaches. Method 700 includes operation 702, where a material is deposited on a substrate. Uniquely, the material includes a plurality of particles (e.g. particles 106, 108 as shown in FIG. 1) configured to complete a self-propagating and/or self-sustaining reaction upon initiation thereof, a solvent system (e.g. solvent system 104 as shown in FIG. 1) and one or more stabilizing agents (e.g. stabilizing agents 110 as shown in FIG. 1).

The reactive ink utilized in method 700 may have any combination of features described above with regard to reactive inks within the scope of the present disclosures, including composition, rheological properties, reactive properties, etc., in various embodiments. Moreover, method 700 may include one or more additional and/or alternative operations, in several approaches.

For example, in one embodiment method 700 may further include initiating the self-propagating and/or self-sustaining reaction. As will be appreciated by those having ordinary skill in the art upon reading the present descriptions, initiation may be accomplished by any suitable means of imparting enough energy to initiate the reaction, including applying a spark, flame, or electrical potential, initiation by chemical reaction, optical initiation, etc. as would be understood by one having ordinary skill in the art upon reading the present descriptions. Initiating the reaction may preferably result in a fully-functional component being formed, e.g. in one approach suitable for use in repairing naval vessels the component may be water-tight and capable of withstanding a predetermined amount of pressure without experiencing structural failure.

In many approaches, the reactive inks have physical characteristics of being deposited by extrusion through a nozzle such as a micro-nozzle. In practice, the reactive ink may be deposited by applying pressure thereto, for example using air pressure or a linear displacement mechanism. Air pressure is a preferred method for starting and stopping the ink flow, while a linear displacement mechanism is preferred when extruding reactive inks exhibiting time dependent rheology and/or time dependent viscosity. Of course, other extrusion techniques may be utilized without departing from the scope of the present disclosures.

In preferred approaches, the physical characteristics of being deposited by extrusion may include the deposited multifunctional reactive ink material having a feature size not more than two orders of magnitude larger than a diameter of the nozzle from which the ink was extruded.

In various approaches, multifunctional inks as described herein may be reactive during extrusion, upon deposition, and/or after an optional curing step such as a simple room-temperature evaporation or a thermal curing to facilitate evaporation of solvent and/or additional materials such as binding agents, organics, stabilizing agents, gelation agents, etc. as would be understood by one having ordinary skill in the art.

In another instance, the multifunctional reactive ink is deposited as a series of layers. The layers may be formed of the same multifunctional reactive ink, or different multifunctional reactive ink formulations may be layered sequentially, in various approaches.

Figure 4A:
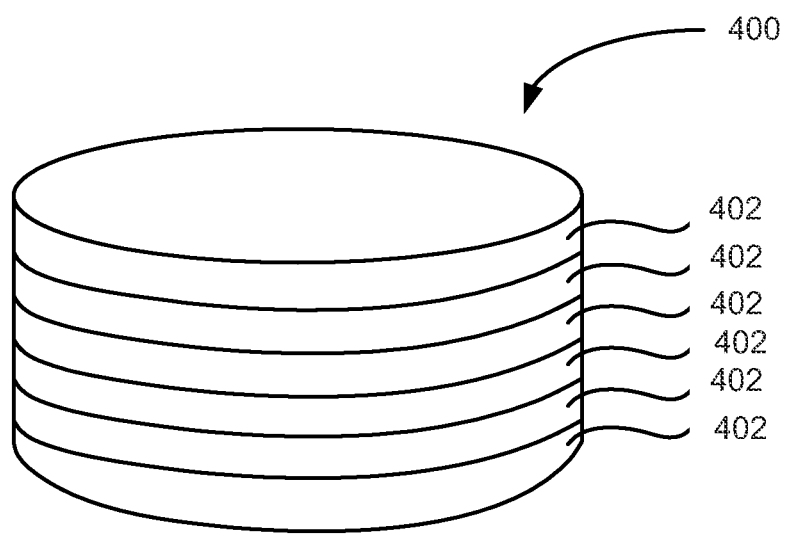
FIG. 4A depicts a schematic representation of a multi-layer structure custom-fabricated using reactive ink, according to one embodiment.
Figure 4B:
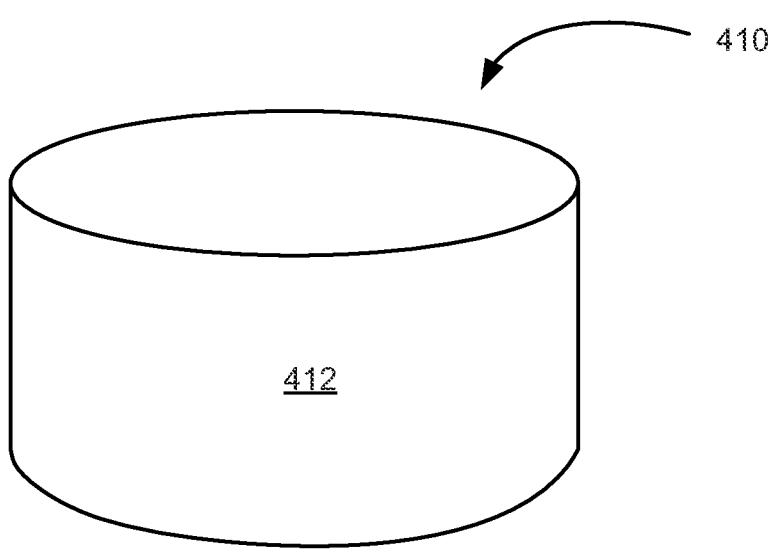
FIG. 4B depicts a schematic representation of a monolithic structure custom-fabricated using reactive ink, according to one embodiment.

In some embodiments, the resulting layered structure may be supplied sufficient energy to initiate the self-propagating and/or self-sustaining reaction, which proceeds to completion to form a monolithic structure such as a cube or cylinder (such as shown in FIGS. 4A-4B and described below). Alternatively, each layer may have its reaction initiated upon extrusion/deposition, i.e. subsequent to depositing the layer and prior to depositing a subsequent additional layer or layer(s).

In some embodiments, the reactive ink may be used primarily to supply energy to melt an adjacent layer. For example, a layer of silver is printed, followed by a layer of the reactive ink. The reactive ink is then ignited to supply a heating source to melt the silver layer. This process is repeated as many times as necessary until the desired part is made.

FIGS. 4A-4B depict various embodiments of structures printed using multifunctional reactive inks in a manner consistent with those described above regarding FIG. 7. More specifically, FIG. 4A shows a layered structure 400 of one or more multifunctional reactive inks deposited in a series of layers 402. Each layer 402 may include one or more different reactive ink compositions as described herein, and upon deposition, each layer 402 may be initiated prior to depositing the subsequent layer 402, or alternatively a subset (up to all) layers 402 may be deposited and the corresponding reactions thereof initiated in a single instance.

Whether reacting each layer individually or all at once, the resulting structure 410 is shown in FIG. 4B as a composite monolith 412 of the reacted layers 402. Preferably, the resulting structure 410 is substantially identical to the deposited multifunctional reactive ink with respect to macro-scale (e.g. >0.5 mm) size and geometry.

FIG. 5 depicts another exemplary arrangement of printed multifunctional reactive inks within the scope of the presently described inventive embodiments. As shown in FIG. 5, the three-dimensional structure 500 is again a multilayered structure as depicted in FIG. 4A, but includes a central gap interior to layers 502, 504 and 506, respectively, resembling a bridge or archway when viewed from the perspective shown. Because the multifunctional reactive ink is self-supporting, the structure 500 may be printed as-is and substantially retain its configuration after drying/or and reaction. There is not a substantial "sagging" effect in the region above the void (i.e. in layers 506) due to the unique structural characteristics of the presently described inks.

In another embodiment, FIG. 5 represents a two dimensional structure 500 such as a printed circuit of a PCB. For example, features 504 may be printed from a reactive ink configured to form a relatively resistive material suited for use as a resistor in a circuit. Similarly, features 506 may be printed from a reactive ink configured to form a material suitable for use in a capacitor of a circuit, and features 502 may be printed from a reactive ink configured to form a highly conductive material suitable for use in a circuit. Upon completing the reaction, the PCB additionally includes a capacitor-to-resistor circuit element. Alternative configurations using various additional and/or other materials to form different types of circuit elements are also within the scope of this disclosure, as would be understood by skilled artisans upon reading the present descriptions.

In some approaches, printing multifunctional reactive inks may include a feedback mechanism to determine the success of printing the desired features (e.g. to measure distortion in three dimensions). One exemplary approach for providing such feedback is laser prolifometry, which may be utilized to scan and adjust the printing process to account for deviations (e.g. by measuring stress, thermal gradients, etc.) from the intended structure and "fix" printing errors in near real-time.

Thermal/Chemical Work

In more embodiments, multifunctional reactive inks may be utilized to perform thermal and/or chemical work, imparting energy onto/into a substrate upon which the ink is deposited upon initiating the corresponding reaction the ink is designed to carry to completion. Exemplary applications of using multifunctional reactive inks to perform thermal and/or chemical work include use as a heat source in a thermal battery, to cut or separate materials, to etch, stamp or label materials, to fuse materials, to initiate a reaction, etc. as would be understood by one having ordinary skill in the art upon reading the present descriptions.

For example, in one embodiment a multifunctional reactive ink may be printed onto an aluminum substrate according to a predetermined pattern designed to produce a desired configuration/structure in the aluminum upon initiating a reaction the multifunctional reactive ink is designed to carry to completion. Upon initiation, the ink imparts sufficient thermal energy to melt the aluminum substrate, effectively cutting the substrate and separating a portion thereof according to the predetermined pattern. The portion may be removed from the remaining substrate and further processed or put directly to its intended use.

Additionally and/or alternatively, multifunctional reactive inks may be designed to perform sufficient thermal and/or chemical work to etch or mar a material for purposes of creating a label, stamp, or other identifying mark. The reactive ink may be printed in a predetermined pattern, for example mimicking a logo, and upon reaction, may etch the surface of the substrate, marking the substrate surface to depict the logo.

In still more embodiments, multifunctional reactive inks may be used to fuse objects, e.g. in a manner akin to brazing or soldering. A substrate surface may be "cleaned" using, for example an acid, and subsequently a multifunctional reactive ink is printed onto the cleaned substrate surface. Upon completing the self-propagating and/or self-sustaining reaction the multifunctional reactive ink is designed to perform, the substrate is fused.

Additional Practical Applications

Embodiments of the present invention may be used in a wide variety of applications. For example, in addition to repairing existing materials and fabricating new materials in an additive fashion, multifunctional reactive inks may be utilized to impart desired properties and/or functionalities on various substrates. For example, a structure (such as a door panel of a military vehicle or panel of a satellite) is fabricated using conventional means. The structure is intended for use in applications which benefit from resistance to radiation, heat, and/or application of acute physical force. In order to confer these properties, a multifunctional reactive ink comprising precursor materials for an appropriate ceramic or cermet material may be printed onto the structure, (or the structure may be dipped or otherwise covered in in the multifunctional reactive ink, etc. as would be understood by one having ordinary skill in the art upon reading the present descriptions. A self-propagating and/or self-sustaining reaction is then initiated to form a layer of the ceramic or cermet material on the structure, conferring the corresponding radiation resistance, thermal insulation, and/or physical resistance of the ceramic/cermet material to the resulting structure.

It should be noted that any of the presently described materials and techniques for use and/or manufacture thereof may be utilized in any combination or permutation. While certain techniques have been set forth under headings and with reference to particular applications, one having ordinary skill in the art reading the present disclosure would appreciate that each technique, and even the sub-techniques thereof, could be utilized broadly in any suitable application. Accordingly, the foregoing descriptions are not to be considered limiting on the manner of manufacturing or using the multifunctional reactive inks described herein.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A material, comprising
a plurality of particles;
a solvent system; and
one or more stabilizing agents,
wherein the particles are configured to complete a self-propagating and/or self-sustaining reaction upon initiation thereof, and
wherein the solvent system and the one or more stabilizing agents are present in an amount effective to make the material structurally self-supporting during deposition of the material onto a substrate and prior to initiation of the self-propagating and/or self-sustaining reaction.

2. The material as recited in claim 1, wherein the effective amount of the one or more stabilizing agents and the solvent system comprises a predetermined volumetric ratio of attractive particles to repulsive particles.

3. The material as recited in claim 1, wherein the material is formed into a self-supporting structure upon the deposition, and
wherein the self-supporting structure is configured to form a reacted product upon completion of the self-propagating and/or self-sustaining reaction.

4. The material as recited in claim 3, wherein the reacted product is one of a cermet, an alloy, and a glass.

5. The material as recited in claim 1, wherein the one or more stabilizing agents comprise polyethyleneimine.

6. The material as recited in claim 1, wherein the material comprises at least a ternary order mixture of the particles, and
wherein the particles comprise a combination of particles of materials selected from a group consisting of: a combination of aluminum and nickel, a combination of titanium and nickel, and combination of boron carbide and titanium.

7. The material as recited in claim 1, wherein the solvent system comprises at least one solvent selected from water, methanol, ethanol, and acetonitrile,
wherein the material is further configured to form a reacted product upon completion of the self-propagating and/or self-sustaining reaction;
wherein the particles comprise a combination of particles of materials selected from a group consisting of: a combination of aluminum and nickel, a combination of titanium and nickel, and combination of boron carbide and titanium;
wherein the one or more stabilizing agents comprise at least one of an acid, a base, an electrolyte and a salt; and
wherein the one or more stabilizing agents comprise at least one of: polyvinylpyrrolidone (PVP), polyethylene glycol (PEG), citric acid, polyacrylic acid, sodium polyacrylate, and ammonium polymethacrylate.

8. The material as recited in claim 1, wherein the one or more stabilizing agents are configured to prevent the particles from forming aggregates prior to the self-propagating and/or self-sustaining reaction, and
wherein the one or more stabilizing agents are present in an amount between 0 vol % and about 1.0 vol %.

9. The material as recited in claim 8, wherein the one or more stabilizing agents comprise polyvinylpyrrolidone (PVP).

10. The material as recited in claim 1, wherein the particles are coated with a stearic coating configured to prevent aggregation of the particles by manipulating electrostatic interactions between the particles.

11. The material as recited in claim 1, further comprising a humectant.

12. The material as recited in claim 1, further comprising an adhesion agent comprising silver nanoparticles, wherein the adhesion agent is configured to facilitate one or more of:
   adhesion of the material to a substrate; and
   adhesion of a plurality of layers of the material to one another during the self-propagating and/or self-sustaining reaction.

13. The material as recited in claim 1, wherein the plurality of particles are disposed in a matrix of liquid metal.

14. The material as recited in claim 1, wherein the particles are present in an amount ranging from about 30 vol % to about 80 vol %.

15. The material as recited in claim 1, wherein the material is formed into a structure comprising a plurality of layers of the material,
   wherein each of the layers is structurally self-supporting prior to initiation of the self-propagating and/or self-sustaining reaction, and
   wherein at least one of the layers is configured as a bridge spanning a gap between the at least one layer and a substrate, such that the bridge is not supported in the gap, and
   wherein the bridge is structurally self-supporting after forming the structure and prior to initiating the self-propagating and/or self-sustaining reaction.

16. The material as recited in claim 1, wherein the material is configured to complete the self-propagating and/or self-sustaining reaction in an oxygen-free environment.

17. The material as recited in claim 1, wherein the material is configured to complete the self-propagating and/or self-sustaining reaction in an aqueous environment.

18. The material as recited in claim 1, wherein the material is conductive upon completion of the self-sustaining and/or self-propagating reaction.

19. A system comprising:
   a three-dimensional positioning apparatus;
   a reservoir having the material as recited in claim 1 stored therein; and
   a nozzle coupled to:
      the reservoir via one or more fluidic channels; and
      the three-dimensional positioning apparatus,
   wherein the nozzle comprises an orifice having a diameter at least approximately two orders of magnitude larger than a diameter of a largest of the particles in the material.

20. A system, comprising:
   a substrate; and
   the material as recited in claim 1 deposited on the substrate in a predetermined pattern;
   wherein the material is nonconductive prior to initiating the self-sustaining and/or self-propagating reaction, and
   wherein the pattern defines a conductive path after completion of the self-sustaining and/or self-propagating reaction.

21. A method, comprising:
   dispersing a plurality of particles in a solution comprising a solvent system to form a dispersion;
   adding a stabilizing agent to the dispersion in an amount sufficient to cause the dispersion to exhibit one or more predetermined rheological properties; and
   depositing the dispersion onto a substrate to form a structurally self-supporting monolith having a filamentary geometry substantially similar to a filamentary geometry of the dispersion,
   wherein the particles are configured to complete a self-propagating and/or self-sustaining reaction upon initiation thereof; and
   wherein the solvent system and the one or more stabilizing agents are present in an amount effective to make the dispersion structurally self-supporting during deposition of the dispersion onto the substrate and prior to initiation of the self-propagating and/or self-sustaining reaction.

22. A method, comprising depositing a material on a substrate, the material comprising:
   a plurality of particles configured to complete a self-propagating and/or self-sustaining reaction upon initiation thereof;
   a solvent system; and
   one or more stabilizing agents; and
   wherein the solvent system and the one or more stabilizing agents are present in an amount effective to make the material structurally self-supporting during deposition of the material onto a substrate and prior to initiation of the self-propagating and/or self-sustaining reaction.

* * * * *